(12) United States Patent
Anantha Narayanan et al.

(10) Patent No.: US 12,037,072 B2
(45) Date of Patent: Jul. 16, 2024

(54) SADDLED VEHICLE

(71) Applicant: TVS MOTOR COMPANY LIMITED, Chennai (IN)

(72) Inventors: Ramanathan Anantha Narayanan, Chennai (IN); Kandasamy Malarkodi, Chennai (IN); Dasarathan Sathishvaran, Chennai (IN); Dhuri Amey Govind, Chennai (IN); Rupesh Arvindakshan, Chennai (IN); Kizakhakhara Chandrashekhar Hiran Kumar, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 472 days.

(21) Appl. No.: 17/298,245

(22) PCT Filed: Nov. 29, 2019

(86) PCT No.: PCT/IN2019/050872
§ 371 (c)(1),
(2) Date: May 28, 2021

(87) PCT Pub. No.: WO2020/110150
PCT Pub. Date: Jun. 4, 2020

(65) Prior Publication Data
US 2022/0119071 A1    Apr. 21, 2022

(30) Foreign Application Priority Data

Nov. 29, 2018  (IN) .............................. 201841045022

(51) Int. Cl.
*B62K 21/12*    (2006.01)
*B62J 50/22*    (2020.01)

(52) U.S. Cl.
CPC ............... *B62K 21/12* (2013.01); *B62J 50/22* (2020.02)

(58) Field of Classification Search
CPC ...... B62K 21/12; B62K 2202/00; B62J 50/22; B62J 6/027; B62J 17/02; B62J 50/225; B62J 23/00
See application file for complete search history.

(56) References Cited

U.S. PATENT DOCUMENTS

2011/0167952 A1*  7/2011  Tajima ..................... B62J 17/02
74/551.8

FOREIGN PATENT DOCUMENTS

| CN | 101497357 A | * | 8/2009 | .............. B62J 17/06 |
| CN | 103010349 A | * | 4/2013 | .............. B62K 21/12 |

(Continued)

OTHER PUBLICATIONS

Machine translation of CN 103010349 A, Masashi et al., Apr. 3, 2013. (Year: 2013).*

(Continued)

*Primary Examiner* — Vinh Luong
(74) *Attorney, Agent, or Firm* — Osha Bergman Watanabe & Burton LLP

(57) ABSTRACT

A saddled vehicle includes: a handlebar assembly for steering of the vehicle; and a handlebar cover assembly including a front handlebar cover and a rear handlebar cover. The front handlebar cover and the rear handlebar cover are configured to enclose a substantial front portion and a rear portion of the handlebar assembly. The handlebar cover assembly includes a top handlebar cover configured to support at least one display device. The front handlebar cover includes a first receiving portion configured to receive a first top cover wall of the top handlebar cover. The rear handlebar cover includes a second receiving portion configured to receive a (Continued)

second top cover wall of the top handlebar cover. The first top cover wall is configured to support at least one accessory. The second top cover wall includes an accommodating portion configured to receive the at least one display device.

9 Claims, 6 Drawing Sheets

(56) References Cited

FOREIGN PATENT DOCUMENTS

| JP | 2011-152849 | A |   | 8/2011  |         |
|----|-------------|---|---|---------|---------|
| JP | 2011152849  | A | * | 8/2011  | B62J 23/00 |
| JP | 5171515     | B2 | * | 3/2013 | B62J 17/04 |
| JP | 5320506     | B2 | * | 7/2013 | B62J 23/00 |
| JP | 5320506     | B2 |   | 10/2013 |         |
| WO | WO 2011155053 | A1 | * | 12/2011 | B62J 23/00 |
| WO | 2017/123165 | A1 |   | 7/2017 |         |
| WO | WO 2017123165 | A1 | * | 7/2017 | B62J 23/00 |

OTHER PUBLICATIONS

Machine translation of JP 5171515 B2, Mar. 27, 2013. (Year: 2013).*
Machine translation of JP 2011152849 A, Sakane et al., Aug. 11, 2011. (Year: 2011).*
EPO machine translation of JP5320506B2, Nakanishi et al., Jul. 19, 2013. (Year: 2013).*
Translation of CN 101497357A, Kitayama et al., Aug. 5, 2009 (Year: 2009).*
International Search Report issued in International Application No. PCT/IN2019/050872, mailed on Feb. 24, 2020 (3 pages).
Written Opinion issued in International Application No. PCT/IN2019/050872, mailed on Feb. 24, 2020 (4 pages).

* cited by examiner

SADDLED VEHICLE

TECHNICAL FIELD

The present invention relates to a two or three-wheeled saddled vehicle and more particularly, but not exclusively to a handlebar cover assembly for a motor vehicle.

BACKGROUND

Typically, vehicle layout design for two or three-wheeled vehicle features a step-through frame and a flat surface called as a floorboard used for resting legs of a rider when the rider puts his/her feet on the floorboard. Further, the motor vehicle features bodywork, including a front leg shield and body that conceals all or most of the mechanisms. A seat assembly is disposed rearwardly to the front leg shield. A storage box is disposed under the seat assembly. Generally, in a two or three-wheeled motor vehicle, a vehicle frame assembly is such that a power train e.g. an internal combustion (IC) engine, an electric motor or the like is positioned in the forward direction of the vehicle. Further, the vehicle frame assembly includes rearwardly obliquely extending pair of rear frames to support one or more rear structures. These pair of rear frames are covered by one or more covers.

Generally, in a two-wheeled or three-wheeled handle bar type vehicle, all or most of the vehicular parts are concealed or covered by a number of body panels. The number of body panels includes a front panel, a rear panel, a front cover, a pair of side panels, a rear cover, and a handlebar cover. Further, a conventional two-wheeled or three-wheeled vehicle includes a handlebar assembly for steering of the vehicle. The handlebar assembly is usually concealed by the handlebar cover. The number of body panels of the vehicle have to be designed such that most of the vehicular parts are concealed appropriately to protect from undesirable environmental damage occurring due to dust, dirt, water, mud, ultraviolet radiation etc., without affecting the aesthetic appeal of the vehicle. For this reason, generally, the handlebar cover includes only two covers, being a front handlebar cover and a rear handlebar cover. The front handlebar cover is configured to support at least one headlamp assembly and the rear handlebar cover is configured to support at least one display device for indicating various vehicular parameters to the user.

However, the handlebar cover as explained above is configured for vehicles with simpler requirements. Any further requirements by the user, like an additional lamp, day-time running lamps, position lamps and the like, a digital display for displaying various vehicular parameters, and a windshield cannot be easily incorporated on to the handlebar cover as provided in the conventional vehicles.

A conventional rear handlebar cover includes a provision for mounting of at least one display device. The handlebar cover is usually made of resin material through molding process. The handlebar cover obtained through molding process is susceptible to manufacturing defects, particularly in the sides and at the center due to shrinkage after removal from the mold and during subsequent cooling. Further, the provision provided in the rear handlebar cover for mounting of the at least one display device also undergoes deformation from its desired shape during the process of cooling. The dimension control of the provision as desired in a part like the rear handlebar cover is difficult to achieve in the conventional rear handlebar cover. The deformed provision may fail to provide required fit and finish with the at least one display device by forming undesired gaps. These undesired gaps provide scope for entry of dust, rain water and other foreign materials. This further calls for frequent servicing of the inside portion of the handlebar cover and the at least one display device.

SUMMARY

Further, the at least one display device mounted to the conventional rear handlebar cover through various mounting portions. The headlamp assembly and the handlebar cover are difficult to service as it requires dismantling of plurality of mounting portions.

Further, in a known typical construction of handlebar cover assembly, the headlamp assembly is disposed on the front handlebar cover and the at least one display device is mounted on the rear handlebar cover. Furthermore, with the increasing requirements from the vehicles as desired by the user, the at least one display device varies widely. Under such requirements, every time the at least one display device undergoes a change in shape, the rear handlebar cover has to be modified. This leads to introduction of changes in the constructional design of the interfacing panels of the vehicles, lower flexibility for users to change vehicle aesthetics as per requirement of different accessories in addition to increase in cost of manufacturing and difficulty in assembly and service. Furthermore, in addition to the increased requirements from the user, the handlebar cover, in particular, the rear handlebar cover carries the load of switch assembly cluster along with the load of the at least one display device. For this kind of requirement, there is a need to strengthen the rear handlebar cover for carrying such a load. The strengthening carried out by known methods is done by the addition of stiffening ribs. This may lead to complexity in design as well as undesirable sink marks due to addition of stiffening ribs. Further, increases the cost of manufacturing and also cost to the user of the vehicle. Hence, the above said design changes is not desirable and is not economically significant.

Further, to overcome the above said concerns, as already known in the art, an additional display device cover is mounted onto the rear handlebar cover. This display cover can accommodate any shape of the at least one display device to be mounted on the vehicle. The rear handlebar cover is capable to accommodate any change in shape of at least one display device through the display cover.

However, the display device cover as described above includes a joining portion with the front handlebar cover. The joining portion between the display cover and the front handlebar cover may constitute uneven gaps there between along a transverse direction with respect to the rear handlebar cover. There may be possibilities of entry of water, rain water and dust through these displeasing gaps. These gaps provide enough clearance for occurrence of vibrations causing noise and irritation to the user. The constant vibrations in the vehicular parts leads to cracks in the components. Furthermore, however, the display cover is not structurally stable enough to support various requirements as desired by the user, which may include a bigger digital cluster, a windshield, an additional lamp assembly.

For example, with the growing requirement of robust display device, it is essential that the at least one display device mounted on the handlebar cover be protected from flying debris such as sand and the like during travelling. Thus, there is a need to provide a protecting shield on the handlebar cover. The display device cover as explained above is not configured to and not capable of supporting the protecting shield as per the requirement. Furthermore, the handlebar cover may have to accommodate an auxiliary headlamp assembly, for example, a position lamp assembly. The display device cover as known in the art would fail as a structural member to support the auxiliary headlamp assembly.

Therefore, despite increasing the number of parts by addition of an exclusive display cover, the structural stability as required in not being addressed by the conventional display cover known in the art.

Thus, an objective of the present subject matter is to provide a structurally efficient member which can support the display device, visor and the position lamp assembly.

It is also an objective of the present invention to provide a display cover to prevent any visible gaps and thus prevent water entry into internal parts of the handlebar cover as well as to resolve above said problems.

The present invention relates to a step-through saddle-ride type two or three-wheeled vehicle and more particularly to a handlebar cover assembly for the step-through saddle ride-type vehicle. The two or three-wheeled vehicle (100) includes a handlebar assembly (109), a handlebar cover assembly (200) comprising a front handlebar cover (202) and a rear handlebar cover (201), the handlebar cover assembly (200) includes a top handlebar cover (203) configured to support at least one display device (205), a first top cover wall (203a) is configured to support at least one accessory (204) and said second top cover wall (203b) includes an accommodating portion (206) configured to receive said at least one display device (205), said accommodating portion (206) includes a shape in conformation with the shape of the at least one display device (205).

BRIEF DESCRIPTION OF THE DRAWINGS

The above and other features, aspects and advantages of the subject matter will be better understood with regard to the following description, appended claims and accompanying drawings, where:

DETAILED DESCRIPTION

Figure 1:
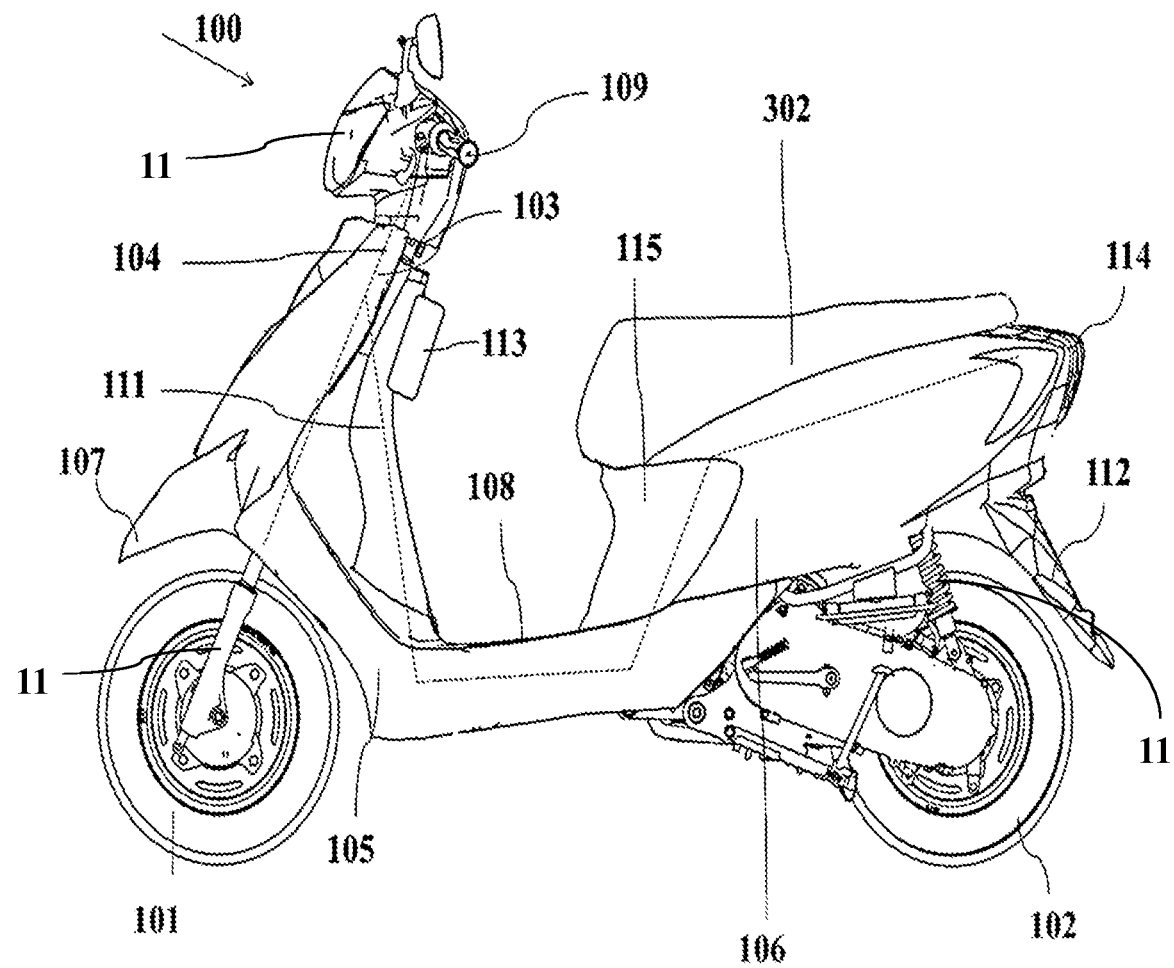
FIG. 1 shows a left side perspective view of the scooter type vehicle.

According to an embodiment of the present invention, the handlebar cover assembly includes front handlebar cover, rear handlebar cover, and a top handlebar cover. The top handlebar cover is configured to extend substantially along a central portion of said rear handlebar cover and said front handlebar cover and said top display cover is juxtaposed over a substantial portion of a joining surface between said front handlebar cover and said rear handlebar cover when viewed from a top view. Further, the top handlebar cover includes a first top cover wall extending along and disposed adjoiningly to said central portion of said front handlebar cover and a second top cover wall extending along and disposed adjoiningly to said central portion of said rear handlebar cover, said first top cover wall is configured to support at least one accessory and said second top cover wall is configured to support said at least one display device.

Further, according to an embodiment of the present invention, the at least one display device is mounted on the second top cover wall which extends longitudinally downwards towards the rear handlebar cover when viewed from side the side view. The visor is mounted onto the first top cover wall, which extends longitudinally downwards towards the front handlebar cover when viewed from a side view. This eliminates the need for an exclusive stay to hold the visor. The first and second top cover wall are manufactured integrally. This prevents any see through gaps and entry of rain water into the internal parts covered by the handlebar cover assembly and enables better structural rigidity thereby eliminating vibration and noise.

Furthermore, according to another embodiment of the present invention, the top handlebar cover, the at least one display device, the auxiliary headlamp assembly, the visor and the front handlebar cover are assembled as a sub-assembly. The entire sub-assembly is then mounted on to the vehicle during assembly of the entire vehicle. The assembling of the sub-assembly prior to assembly onto the vehicle saves assembly time during vehicle assembly, as it involves elimination of assembly of many individual parts that have now formed part of the sub-assembly. Furthermore, in need of servicing the under parts of the handlebar cover assembly, the front handlebar cover alone can be retracted from the vehicle and serviced. This facilitates quicker and easier servicing, thereby eliminating any tedious procedure for servicing including dismantling of various covers assembled onto the vehicle.

According to another embodiment of the present invention, the front handlebar cover includes a locking mechanism to hold the top handlebar cover during sub-assembly. In particular, as per an embodiment of the present invention, the locking mechanism includes a U-shaped protrusion to hold at least a portion of the top handlebar cover in desired position. Furthermore, the U-shaped protrusion also facilitates receiving of at least a portion of the rear handlebar cover during assembling of the sub-assembly on to the vehicle. Therefore, according to an embodiment of the present invention, the top handlebar cover is an adaptable handlebar cover configured to accommodate various design shapes of the display device instrument clusters. The top handlebar cover is configured with various mounting and attachment portions to enable replacement of the display device as well as accessories like visor, a headlamp, a position lamp etc. from having one shape to another shape without having a need to change the front handlebar cover and the rear handlebar cover. The present configuration of having the top handlebar cover not only enables flexibility of accommodating various display clusters but also enables eliminating the problem involved in varied production, difficulty in manufacturing, assembly, consistency of geometric dimensional control to achieve good quality fit and finish as well as enabling option of changing aesthetics of vehicle at low cost without undue change of interfacing parts.

According to an embodiment of the present invention, the first top cover wall and the second top cover wall are integrally formed. The first top cover wall extends downwardly along most portion of the central portion of the front handlebar cover. The first top cover wall includes substantial surface area that is configured to be structurally stable and support one or more accessories mounted on it. For example, the first top cover wall is configured to receive at least a portion of a visor and at least a portion of an auxiliary headlamp assembly. Both visor and auxiliary headlamp assembly project outwardly of the handlebar cover assembly.

According to an embodiment of the present invention, the first top cover wall includes one or more mountings configured to receive the visor. Further, the first top cover wall includes at least two mountings to receive the auxiliary headlamp assembly. Further, the second top cover wall includes at least one mounting to support the at least one display device.

According to an embodiment of the present invention, the second top cover wall includes an accommodating surface disposed lower than other surfaces of the second top cover wall. The accommodating surface includes a shape in conformation with the shape of the at least one display device and is configured to substantially support the at least one display device there within. The shape and the lower surface of the accommodating surface provides to retain the original position of at least one display device as in assembled condition during assembly on to the vehicle. Furthermore, the accommodating surface includes a continuous surface with respect to the other surfaces of the top handlebar cover. The continuous surface between the accommodating surface and the rest of the surface allows better dimension control for the accommodating surface as desired to substantially support the at least one display device. Furthermore, the continuous surface also prevents any shrinkage and deformation of the accommodating surface during cooling process after removal from the mold during manufacturing of the top display cover. The accommodating surface so obtained as explained above also does not include any see through gaps and undesired gaps with respect to the at least one display device. As a result, the frequent servicing of the top handle bar cover is not necessary.

Furthermore, the accommodating surface in particular includes the at least one mounting to receive the at least one display device.

According to another embodiment of the present invention, in addition to the mountings between the top handle bar cover and the rear handle bar cover, a locator is provided in the top handlebar cover and a hole is provided on the rear handlebar cover configured to receive the locator. The hole and the locator provides additional support between the top handle bar cover and the rear handle bar cover and prevents any undesired gaps that may develop there between due to constant vibrations that may occur during vehicle running condition and additionally eliminating any irritation caused to the user like rattling noise and enabling good durability and reliability of the system.

These and other advantages of the present invention are described in the detailed description of the figures of an embodiment in a scooter type motor vehicle provided below.

FIG. 1 shows a left side perspective view of the scooter type vehicle. The vehicle 100 has a body frame assembly made up of several tubes welded together which usually supports the body of the said vehicle. The vehicle 100 has a steerable front wheel 101 and a driven rear wheel 102. The vehicle frame assembly of the vehicle is an elongated structure, which typically extends from a forward end to a rearward end of the vehicle. It is generally convex in shape, as viewed from a side elevation view. The frame assembly includes a head tube 104, a main frame 111 and also may have a sub-frame. The sub-frame is attached to the main frame 111 using appropriate joining mechanism. The frame assembly is covered by a plurality of vehicle body covers including a front panel 103, a rear cover (not shown), a left front bottom panel 105, and a pair of side panels 106.

A handlebar assembly 109 and a seat assembly 302 are supported at opposing ends of the vehicle frame assembly and a generally open area is defined there between known as floorboard 108 which functions as a step through space. A seat assembly 302 for a driver and a pillion is placed forward to a fuel tank (not shown) and rear side of floorboard 108. A front fender 107 is provided above the front wheel 101 to avoid the vehicle 100 and its occupants from being splashed with mud. Likewise, a rear fender 112 is placed between the fuel tank and the rear wheel 102, and to the outer side in the radial direction of the rear wheel 102. The rear fender 112 inhibits rain water or the like from being thrown up by the rear wheel 102. A front cover assembly 115 is disposed rearwardly to the floorboard 108.

Suspensions are provided for comfortable steering of the vehicle 100 on the road. A front suspension assembly 116 is connected to a front fork (not shown). The rear suspension assembly 117 comprises of at least one rear suspension preferably on the left side of the vehicle. However, a vehicle with two rear suspensions, namely on the left side and the right side is also possible. For the safety of the user and in conformance with the traffic rules, a headlamp assembly 110 in the front portion of the vehicle and a taillight assembly 114 in the rear portion of the vehicle 100 is also provided. For the utility of the rider, a secondary storage assembly 113 is disposed in front of the front cover assembly 115.

Figure 2B:
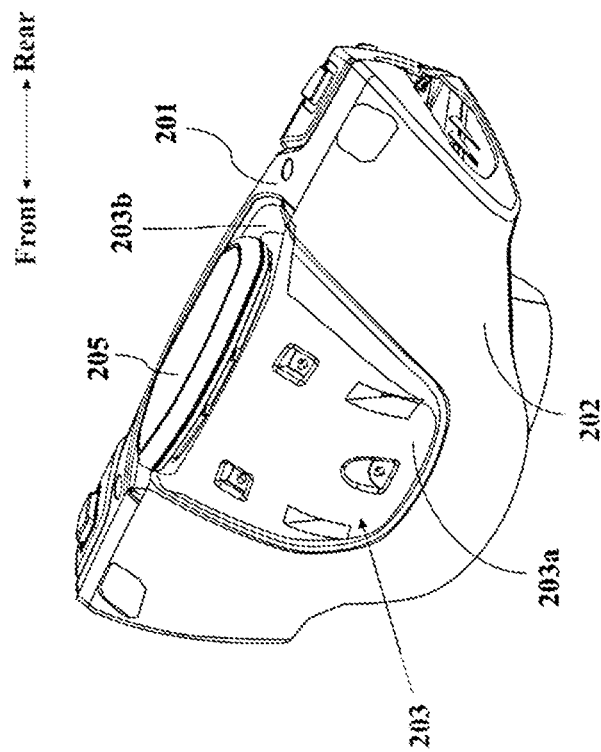
FIG. 2(b) illustrates a front perspective view of the handlebar cover assembly according to an embodiment of the present invention.
Figure 2A:
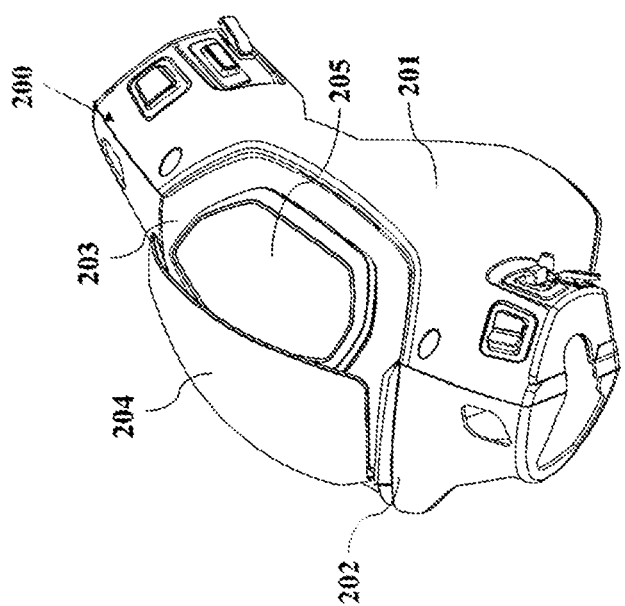
FIG. 2(a) illustrates a top perspective view of a handlebar cover assembly according to an embodiment of the present invention.

FIG. 2(a) illustrates a top perspective view of a handlebar cover assembly according to an embodiment of the present invention. FIG. 2(b) illustrates a front perspective view of the handlebar cover assembly according to an embodiment of the present invention. The handlebar cover assembly 200 includes a front handlebar cover 202, a rear handlebar cover 201 and, a top handlebar cover 203. The top handlebar cover 203 is configured to receive at least a portion of an accessory 204, for example a visor 204 in the present embodiment, and at least one display device 205. The front handlebar cover 202, the rear handlebar cover 201, the top handlebar cover 203, the at least one display device 205 and the visor 204 are pre-assembled as a sub-assembly and then the entire sub-assembly are assembled on to the vehicle. The sub-assembly saves assembly time during assembling the entire handlebar cover assembly 200 on to the vehicle. Furthermore, during servicing, the entire sub-assembly need not to dismantled. Instead, only the front handlebar cover 202 may be dismantled to obtain access to the top handlebar cover 203.

Figure 3B:
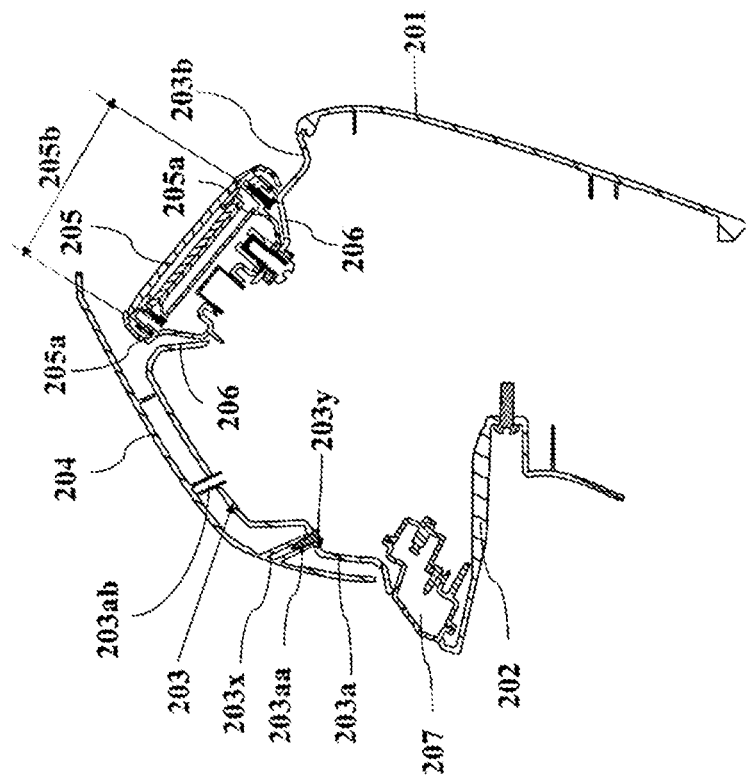
FIG. 3(b) illustrates a sectional view of the handlebar cover assembly as taken along X-X axis as illustrated in FIG. 3(a).
Figure 3A:
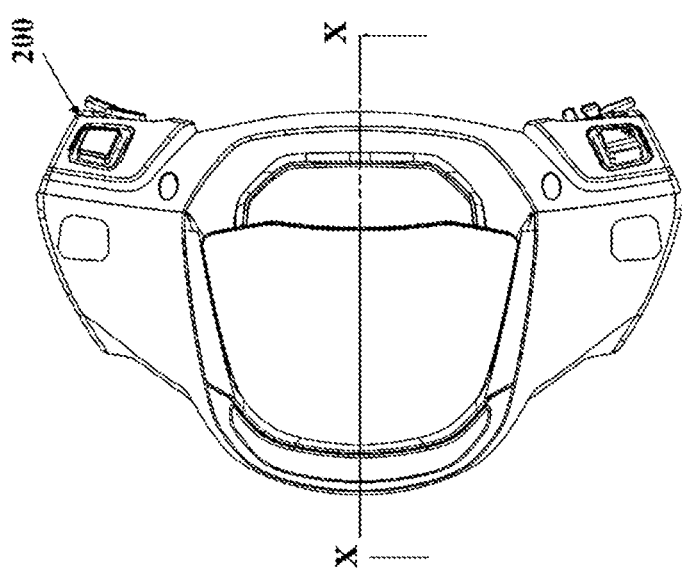
FIG. 3(a) illustrates a top view of the handlebar cover assembly.

FIG. 3(a) illustrates a top view of the handlebar cover assembly. FIG. 3(b) illustrates a sectional view of the handlebar cover assembly as taken along X-X axis as illustrated in FIG. 3(a). According to an embodiment of the present invention, the second top cover wall 203b is configured to extend inclinedly rearwardly to said first top cover wall 203a. The first top cover wall 203a is configured to support the visor 204. The first top cover wall 203a includes at least one first mounting 203aa. The at least one first mounting 203aa includes a first protrusion 203x configured to receive at least one mounting member 203y to attach the visor 204 to the first top cover wall 203a. Further, in addition to the at least one first mounting 203aa, at least one locating member 203ab is provided to hold the visor in position after assembling on to the first top cover wall 203a.

Further, the top cover wall 203a includes a cut out to support an auxiliary headlamp assembly 207 disposed below the visor 204. The visor 204 protects the at least one display device 205 from flying objects that may damage the display of the at least one display device 205. The at least one display device 205 is disposed in an accommodating portion 206. The accommodating portion 206 approximately includes shape in conformation with the shape of the at least one display device 205. The accommodating portion 206 is configured to substantially support the at least one display device 205. Further, the second top cover wall 203b includes a provision to facilitate mounting of the at least one display device 205 on to the second top cover wall 203b.

According to an embodiment of the present invention, the at least one display device is at least one of an analog device and a digital device.

According to another embodiment of the present invention, the accommodating portion 206 is configured to receive the at least one display device 205 from upward direction. The at least one display device 205 is installed from top of the accommodating portion 206. The accommodating portion 206 is a closed structure and does not include a through hole. The accommodating portion 206 includes at least one provision to facilitate passage of connecting cables. The accommodating portion 206 includes a shape in conformation with the shape of a mounting portion 205a of the at least one display device 205. However, the display portion 205b is protruding outwardly of the accommodating portion 206. The outwardly protrusion of the display portion 205b provides the flexibility of accommodation of display portion 205b of any shape and size. The display portion 205b of any shape and size is not restricted by the shape of the mounting portion 205a. The accommodating portion 206 is disposed beneath the display portion 205b. Therefore, the top cover wall 203a as proposed in the present subject matter can be commonly used irrespective of the size and shape of the display portion 205b. Further, the interfacing panels of the top cover wall 203a also remains same and does not call for the need of providing new interfacing panels in the vehicle.

Figure 4:
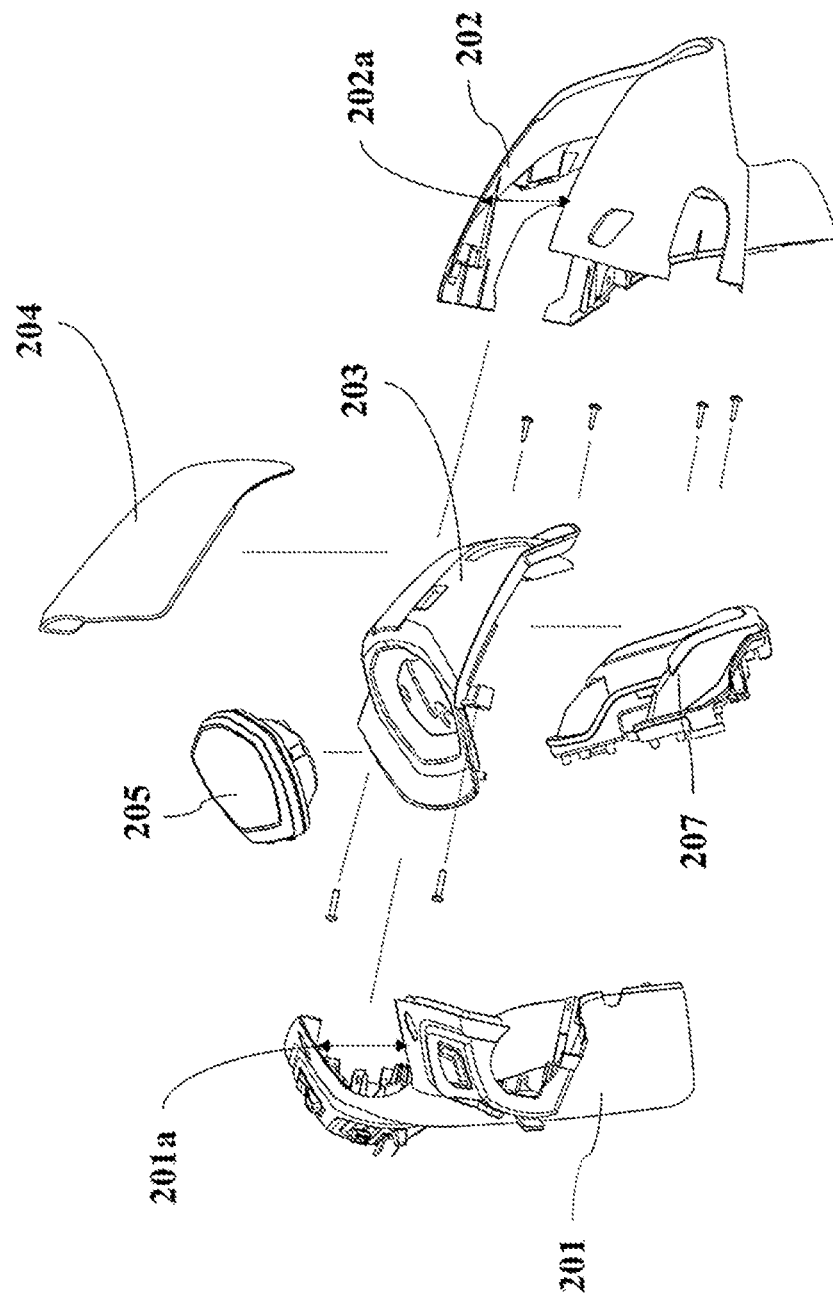
FIG. 4 illustrates an exploded view of the handlebar cover assembly according to an embodiment of the present invention.

FIG. 4 illustrates an exploded view of the handlebar cover assembly according to an embodiment of the present invention. The handlebar cover sub-assembly includes the visor 204 assembled onto the first top cover wall 203a of the top handlebar cover 203. The front handlebar cover 202 includes a first receiving portion 202a configured to receive the first top cover wall 203a. Further, the rear handlebar cover 201 includes a second receiving portion 201a configured to receive the second top cover wall 203b. The first receiving portion 202a and the second receiving portion 201a include a shape in conformation with the shape of the first top cover wall 203a and the second top cover wall 203b. This shape is configured to achieve effective fit and finish with the top handlebar cover 203.

Figure 5:
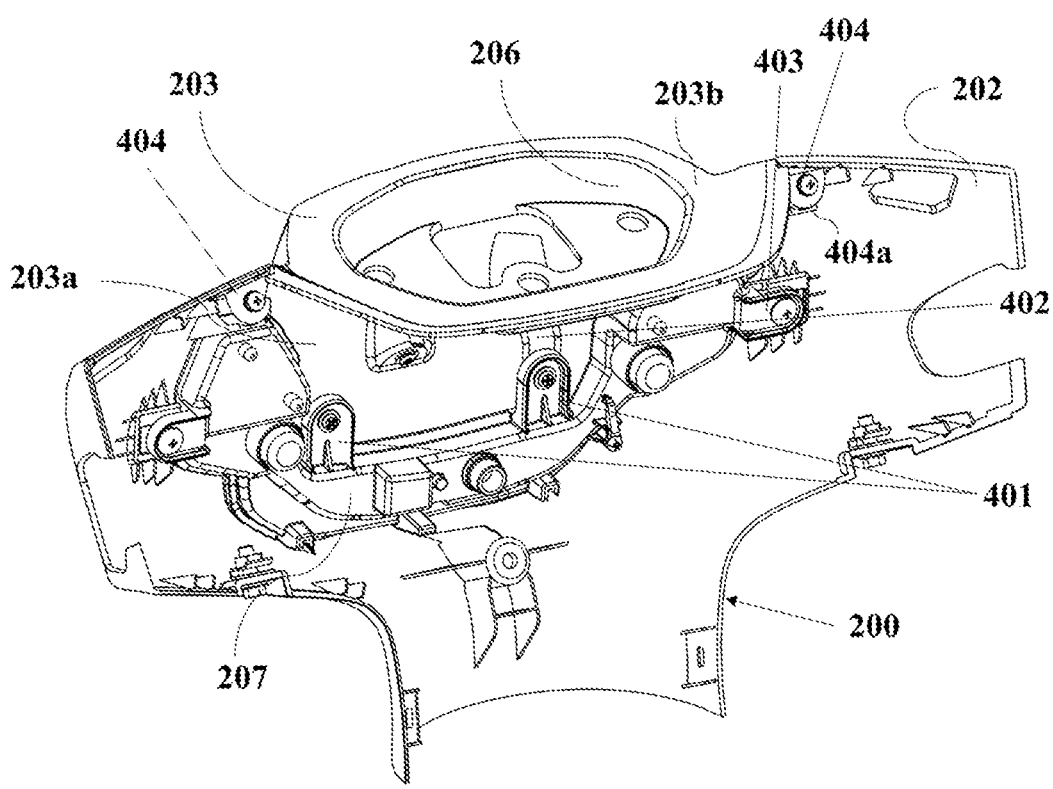
FIG. 5 illustrates a rear perspective view of the handlebar cover sub-assembly according to an embodiment of the present invention.

FIG. 5 illustrates a rear perspective view of the handlebar cover sub-assembly according to an embodiment of the present invention. The first top cover wall 203a includes one or more receiving portions 402 configured to receive the auxiliary headlamp assembly 207. The auxiliary headlamp assembly 207 includes one or more mounting portions 401 configured to be attached to the one or more receiving portions 402. Further, the auxiliary headlamp assembly 207 includes at least one attaching member 403 configured to be attached to at least a portion of the front handlebar cover 202.

According to another embodiment of the present invention, the front handlebar cover 202 includes a locking mechanism 404 to hold the top handlebar cover 203 during sub-assembly. In particular, the locking mechanism 404 includes a U-shaped protrusion 404a to hold at least a portion of the top handlebar cover 203 in desired position.

Figures 6A, 6B, 6C:
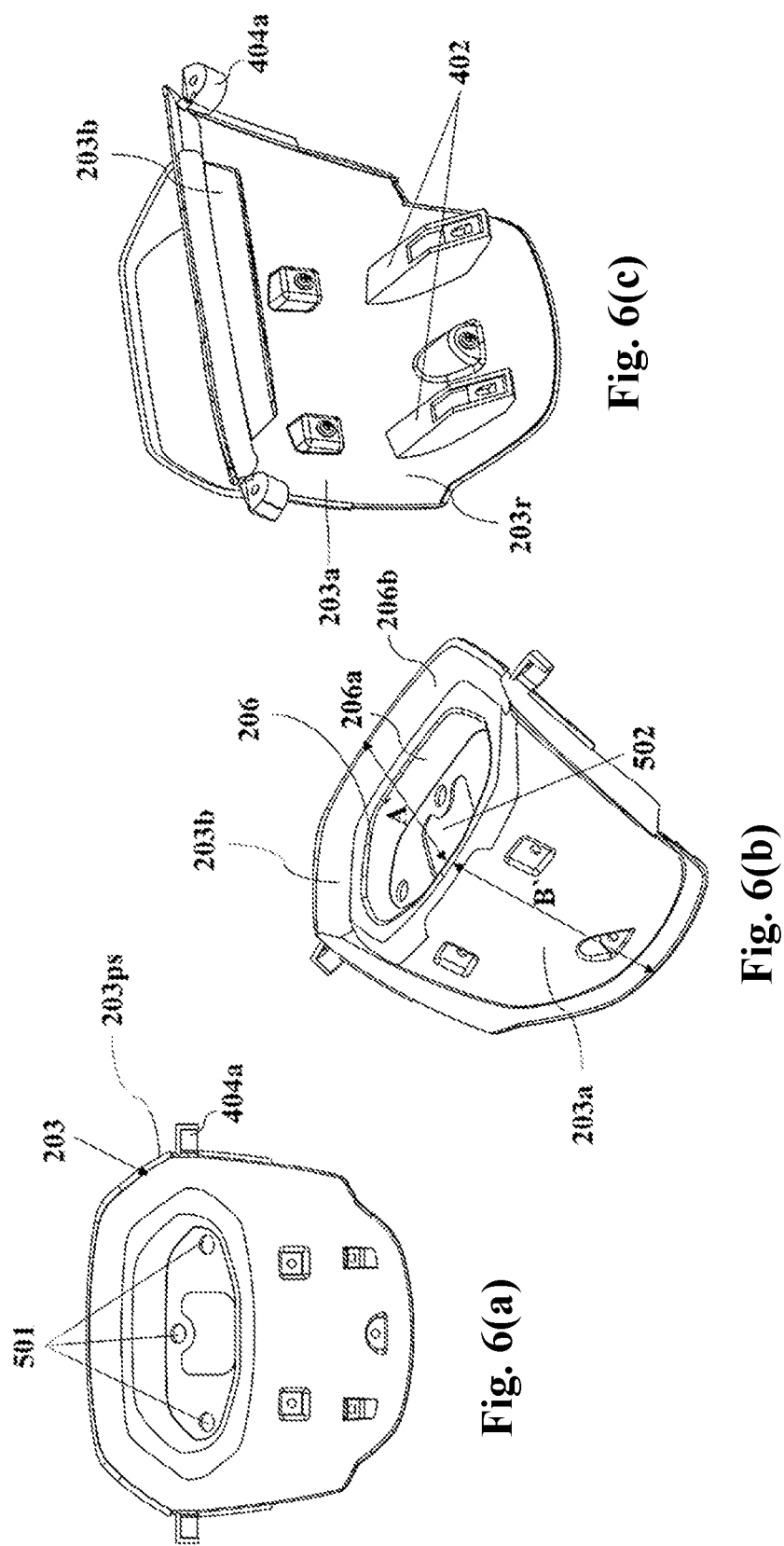
FIG. 6(a) illustrates a front view of the top handlebar cover according to an embodiment of the present invention.
FIG. 6(b) illustrates a front perspective view of the top handlebar cover according to an embodiment of the present invention.
FIG. 6(c) illustrates a rear perspective view of the top handlebar cover according to an embodiment of the present invention.

FIG. 6(a) illustrates a front view of the top handlebar cover according to an embodiment of the present invention. The top handlebar cover 203 includes the accommodating portion 206 configured to receive the at least one display device (not shown) through at least one mounting provision 501. Further, the second top cover wall 203b includes the at least one U-shaped protrusion 203 disposed on an outer peripheral surface 203ps. The at least one U-shaped protrusion 203 is extending outwardly of the outer peripheral surface 203ps, such that it is configured to receive the mating parts, for example the front handlebar cover and the rear handlebar cover (not shown).

FIG. 6(b) illustrates a front perspective view of the top handlebar cover according to an embodiment of the present invention. The accommodating portion 206 includes an accommodating surface 206a disposed lower to an outer circumferential surface 206b of the second top cover wall 203b. Such that, a depression is created in the surface and includes a shape in conformation with the shape of the at least one display device and can appropriately support the at least one display device (not shown). Further, the accommodating portion 206 includes a provision 502 to facilitate pass-through of connecting cables attached to the at least one display device.

FIG. 6(c) illustrates a rear perspective view of the top handlebar cover according to an embodiment of the present invention. A rear surface 203r of the first top cover wall 203a includes one or more receiving portions 402 configured to receive at least a portion of the auxiliary headlamp assembly.

According to an embodiment of the present invention, the second top cover wall 203b includes a first length of A'. The first length A' is at least one-third of a second length B' of the first top cover wall 203a. The at least one-third length of the second top cover wall 203b is configured to accommodate the at least one display device and the available lengthier side of the first top cover wall 203a provides sufficient surface area for mounting of the at least one accessory and in addition, is capable of accommodating at least a portion of the auxiliary headlamp assembly. The adequate surface area is capable of appropriately supporting the external load applied on to the first top cover wall 203a during mounting of the at least one accessory and in addition, the load received from assemblies like the auxiliary headlamp assembly, which may include position lamp assembly and the like. Further, the at least one-third length of the second top cover wall 203b is appropriately sufficient to support the size and shape of the display device. The second top cover wall 203b need not be further supported with external reinforcing structures to provide strength to hold the display device.

However, the length of the second top cover wall 203b being lesser than the one-third length of the first cover wall 203a may fail to support the size and shape of the display device without any external support.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

REFERENCE SIGNS LIST

100—Saddle ride-type vehicle
101—Front wheel
102—Rear wheel
103—Front panel
104—Head tube
105—Left front bottom panel
106r, 106l—Pair of side panels
107—Front fender
108—Floorboard
109—Handlebar assembly
110—Headlamp assembly
111—Main frame
112—Rear fender
115—Front cover assembly
113—Secondary storage assembly
114—Taillight assembly
115—Front cover assembly
116—Front suspension assembly
117—Rear suspension assembly
200—Handlebar cover assembly
201—Rear handlebar cover
201a—Second receiving portion
202—Front handlebar cover
202a—First receiving portion
203—Top handlebar cover
203a—First top cover wall
203aa—At least one first mounting
203ab—At least one locating member
203x—First protrusion 203x
203y—At least one mounting member
203b—Second top cover wall
203ps—Outer peripheral surface
203r—Rear surface
204—At least one accessory, visor
205—at least one display device
206—Accommodating portion
207—Auxiliary headlamp assembly
401—One or more mounting portions
402—One or more receiving portions
403—At least one attaching member
404—Locking mechanism
404a—U shaped protrusion
501—At least one mounting provision
502—Provision
A'—First length
B'—Second length

We claim:

1. A saddled vehicle, said vehicle comprising:
a handlebar assembly for steering of said vehicle; and
a handlebar cover assembly comprising a front handlebar cover and a rear handlebar cover, said front handlebar cover and said rear handlebar cover are configured to enclose a substantial front portion and a rear portion of said handlebar assembly, said handlebar cover assembly includes a top handlebar cover configured to support at least one display device, said front handlebar cover includes a first receiving portion configured to receive a first top cover wall of said top handlebar cover and said rear handlebar cover includes a second receiving portion configured to receive a second top cover wall of said top handlebar cover, said first top cover wall is configured to support at least one accessory and said second top cover wall includes an accommodating portion configured to receive said at least one display device, said accommodating portion includes a shape in conformation with a shape of a mounting portion of the display device and said accommodating portion is disposed beneath a display portion of the display device.

2. The saddled vehicle as claimed in claim 1, wherein said accommodating portion includes an accommodating surface disposed lower to a circumferential surface adjoining said accommodating surface of said second top cover wall.

3. The saddled vehicle as claimed in claim 1, wherein said first top cover wall includes at least one first mounting comprising a first protrusion configured to receive at least one mounting member configured to attach the at least one accessory to the first top cover wall.

4. The saddled vehicle as claimed in claim 1, wherein said first top cover wall includes at least one locating member configured to hold the at least one accessory on to the first top cover wall.

5. The saddled vehicle as claimed in claim 1, wherein said first top cover wall is configured to receive at least a portion of an auxiliary headlamp assembly.

6. The saddled vehicle as claimed in claim 5, wherein
said first top cover wall includes one or more receiving portions configured to receive the auxiliary headlamp assembly and
the auxiliary headlamp assembly includes at least one attaching member configured to be attached to at least a portion of the front handlebar cover.

7. The saddled vehicle as claimed in claim 1, wherein
said front handlebar cover includes a locking mechanism to hold the top handlebar cover,
the locking mechanism includes a U-shaped protrusion to hold at least a portion of the top handlebar cover,
said U-shaped protrusion is disposed on an outer peripheral surface of the second top cover wall.

8. The saddled vehicle as claimed in claim 6, wherein
said auxiliary headlamp assembly includes one or more mounting portions configured to be attached to one or more receiving portions disposed on said top handlebar cover,
said second top cover wall has a first length in a longitudinal direction of the saddled vehicle,
said first top cover wall has a second length in the longitudinal direction of the saddled vehicle, and
said first length is at least one-third of said second length.

9. A saddled vehicle, said vehicle comprising:
a handlebar assembly for steering of said vehicle; and
a handlebar cover assembly comprising a front handlebar cover and a rear handlebar cover, said front handlebar cover and said rear handlebar cover are configured to enclose a substantial front portion and a rear portion of said handlebar assembly, said handlebar cover assembly includes a top handlebar cover configured to support at least one display device, said front handlebar cover includes a first receiving portion configured to receive a first top cover wall of said top handlebar cover and said rear handlebar cover includes a second receiving portion configured to receive a second top cover wall of said top handlebar cover, said first top cover wall is configured to support at least one accessory and said second top cover wall includes an accommodating portion configured to receive said at least one display device, said accommodating portion includes a shape in conformation with the shape of the at least one display device.

\* \* \* \* \*